United States Patent
Schober et al.

(10) Patent No.: US 9,515,709 B2
(45) Date of Patent: Dec. 6, 2016

(54) CHANNEL ESTIMATION WITH PRECODING MATRIX SMOOTHING AT THE TRANSMITTER

(71) Applicant: Nokia Corporation, Espoo (FI)

(72) Inventors: Karol Schober, Helsinki (FI); Mihai Horatiu Enescu, Espoo (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 14/305,222

(22) Filed: Jun. 16, 2014

(65) Prior Publication Data

US 2015/0365145 A1    Dec. 17, 2015

(51) Int. Cl.
*H04B 7/02* (2006.01)
*H04B 7/04* (2006.01)
*H04L 5/00* (2006.01)
*H04B 7/06* (2006.01)

(52) U.S. Cl.
CPC .......... *H04B 7/0417* (2013.01); *H04B 7/0456* (2013.01); *H04B 7/0486* (2013.01); *H04B 7/066* (2013.01); *H04B 7/0639* (2013.01); *H04L 5/003* (2013.01)

(58) Field of Classification Search
None
See application file for complete search history.

(56) References Cited

U.S. PATENT DOCUMENTS

| 7,676,007 | B1 | 3/2010 | Choi et al. | |
|---|---|---|---|---|
| 7,965,780 | B2 | 6/2011 | Lindoff et al. | |
| 8,165,231 | B2 | 4/2012 | Sandell | |
| 8,179,775 | B2 | 5/2012 | Chen et al. | |
| 8,195,184 | B2 * | 6/2012 | Kent | H04B 7/0632 370/395.2 |
| 2012/0082190 | A1 | 4/2012 | Zhu et al. | |
| 2012/0170627 | A1 * | 7/2012 | Koike | H04B 7/0413 375/219 |
| 2014/0286291 | A1 * | 9/2014 | Einhaus | H04B 7/024 370/329 |

FOREIGN PATENT DOCUMENTS

WO    2014/039056 A1    3/2014

OTHER PUBLICATIONS

Extended European Search Report dated Nov. 9, 2015, issued in corresponding EP Application No. 15171101.7.

* cited by examiner

*Primary Examiner* — Adolf Dsouza
(74) *Attorney, Agent, or Firm* — Squire Patton Boggs (US) LLP

(57) ABSTRACT

Various communication network may benefit from precoding matrix smoothing. For example, a network node comprises a processor and a memory including computer program code. The memory and the computer program code, with the processor, are configured to cause the network node to receive a precoding matrix index indicating a precoding matrix, allocate resources for downlink transmission to a user equipment, smooth a plurality of precoding matrices including the precoding matrix across the allocated resources and transmit a signal indicating the plurality of precoding matrices have been smoothed. Based on the signal, the user equipment can perform interference reduction or cancellation.

22 Claims, 5 Drawing Sheets

CHANNEL ESTIMATION WITH PRECODING MATRIX SMOOTHING AT THE TRANSMITTER

TECHNICAL FIELD

The exemplary and non-limiting embodiments relate generally to wireless communication systems, methods, devices and computer programs and, more specifically, to channel estimation at a wireless receiver.

BACKGROUND

Various channel estimation methods are used in different cellular communications systems. One cellular network system, referred to as the third generation partnership project (3GPP) work item on the Long Term Evolution (LTE), is widely used for wireless communications. In the current 3GPP LTE downlink standard, channel estimation at user equipment (UE) is performed per physical resource block (PRB) or per PRB group (PRG), when user-specific demodulation reference signal (DM-RS) symbols are utilized. From the channel state information (CSI) feedback perspective, two operation modes of feedback are possible: wideband and frequency selective precoding matrix indicator (PMI) and channel quality indicator (CQI) feedback.

Unlike transmission schemes using cell-specific reference symbols (CRS), transmission schemes using spatially precoded user-specific reference symbols DM-RS do not require precoding matrix knowledge at the receiver for data demodulation, because precoding matrix is included implicitly in the channel estimation. In general, reliable channel estimation is needed at the demodulation stage. It has been shown, for example, during the work on the topic of the network aided interference cancellation and suppression (NAICS) in LTE release 12, not only the desired stream channel estimation is important, but also equally reliable channel estimation needs to be performed so that the dominant interference can be cancelled or eliminated at the UE side by means of non-linear advanced receivers. Moreover, for the interfering UE, a blind detection stage of modulation is needed in addition to the channel estimation in order to allow the applicability of non-linear receivers such as symbol level interference cancellation (SLIC) receivers. As the blind detection of the modulation is performed based on the effective channel of the interferer, it is evident that reliability of such channel estimation is crucial.

It is well noted that the quality of channel estimation has an impact on data demodulation performance of the receiver. Thus, improving the channel estimation at a receiver is always desirable regardless whether the receiver has interference cancellation capability.

SUMMARY

The below summary section is intended to be merely exemplary and non-limiting.

Various aspects of examples of the invention are set out in the claims.

In a first aspect thereof an exemplary embodiment provides an apparatus comprising at least one processor and at least one memory including computer program code, wherein the at least one memory and the computer program code are configured, with the at least one processor, to cause said apparatus to transmit a precoding matrix index indicating a precoding matrix to a network node, receive a signal indicating a plurality of precoding matrices including the precoding matrix have been smoothed across allocated resources, and perform channel estimation across the allocated resources based on the received signal.

In another aspect thereof an exemplary embodiment provides an apparatus comprising at least one processor and at least one memory including computer program code, wherein the at least one memory and the computer program code are configured, with the at least one processor, to cause said apparatus to transmit a precoding matrix index to inform a network node of a precoding matrix, receive a signal indicating a plurality of precoding matrices including the precoding matrix have been smoothed across allocated resources, and perform channel estimation across the allocated resources based on the received signal. The precoding matrix index can comprise at least one of a wideband precoding matrix index or a frequency selective precoding matrix index. The allocated resources are scheduled for downlink transmission, which can be on a physical downlink shared channel (PDSCH). The plurality of precoding matrices are smoothed via interpolation of the plurality of precoding matrices across the allocated resources or via some other methods. The network node ensures or guarantees the distance between two of the plurality of precoding matrices of adjacent allocated resources being not more than a threshold, which can be a pre-defined or adjustable value or parameter. The information of the plurality of the precoding matrices been smoothed across the allocated resources can be indicated in another signal to be transferred to another user equipment, and the another signal is used for interference estimation at the another user equipment.

In another aspect thereof an exemplary embodiment provides an apparatus comprising at least one processor and at least one memory including computer program code, wherein the at least one memory and the computer program code are configured, with the at least one processor, to cause said apparatus to transmit a precoding matrix index to inform a network node of a precoding matrices, receive a signal indicating a plurality of precoding matrices including the precoding matrix have been modified across allocated resources due to co-scheduled UE's layer, and perform channel estimation across the allocated resources based on the received signal. The resource allocation or scheduling is performed based on a precoded demodulation reference signal. The modification of the precoding matrices is made via interpolation, which comprises at least one of Grassmanian manifold interpolation, Flag manifold interpolation, Stiefel manifold interpolation, or Linear interpolation. The channel estimation is used for demodulating the data carried on the allocated resources.

In further aspect thereof an exemplary embodiment provides an apparatus comprising at least one processor and at least one memory including computer program code, wherein the at least one memory and the computer program code are configured, with the at least one processor, to cause said apparatus to transmit a precoding matrix index indicating a precoding matrix to a network node, receive a signal indicating a plurality of precoding matrices including the precoding matrix have been smoothed across allocated resources, and perform channel estimation across the allocated resources based on the received signal. Another signal indicating the precoding matrix indices been smoothed across allocated resources is transferred to another user equipment and the another signal is used for interference estimation at the another user equipment, wherein the interference estimation is for interference cancellation or elimination as part of the demodulation of downlink transmission at the another user equipment.

In another aspect thereof an exemplary embodiment provides an apparatus comprising means for transmitting a precoding matrix index indicating a precoding matrix to a network node, means for receiving a signal indicating a plurality of precoding matrices including the precoding matrix have been smoothed across allocated resources, and means for performing channel estimation across the allocated resources based on the received signal.

In another aspect thereof an exemplary embodiment provides an apparatus comprising at least one processor and at least one memory including computer program code, wherein the at least one memory and the computer program code are configured, with the at least one processor, to cause said apparatus to receive a precoding matrix index indicating a precoding matrix, allocate resources for downlink transmission to a user equipment, smooth a plurality of precoding matrices including the precoding matrix across the allocated resources, and transmit a signal indicating the plurality of precoding matrices been smoothed.

In another aspect thereof an exemplary embodiment provides an apparatus comprising at least one processor and at least one memory including computer program code, wherein the at least one memory and the computer program code are configured, with the at least one processor, to cause said apparatus to receive a precoding matrix index indicating a precoding matrix, allocate resources for downlink transmission to a user equipment, smooth a plurality of precoding matrices including the precoding matrix across the allocated resources, and transmit a signal indicating the plurality of precoding matrices been smoothed. The allocated resources is for downlink transmission, which can be on PDSCH. Smoothing the plurality of precoding matrices comprises performing interpolation of the plurality of precoding matrices across the allocated resources, and it can also comprise ensuring distance between two of the plurality of precoding matrices of adjacent allocated resources being not more than a threshold. The threshold is a pre-defined parameter or an adjustable parameter. The interpolation can be one of Grassmanian manifold interpolation, Flag manifold interpolation, Stiefel manifold interpolation or Linear interpolation. The resource allocation or scheduling is performed based on a precoded demodulation reference signal.

In further aspect thereof an exemplary embodiment provides an apparatus comprising at least one processor and at least one memory including computer program code, wherein the at least one memory and the computer program code are configured, with the at least one processor, to cause said apparatus to receive a precoding matrix index indicating a precoding matrix, allocate resources for downlink transmission to a user equipment, smooth a plurality of precoding matrices including the precoding matrix across the allocated resources, and transmit a signal indicating the plurality of precoding matrices been smoothed. The apparatus will transmit another signal indicating the plurality of precoding matrices been smoothed to another network node, wherein the another signal can be an X2 signal. Moreover, the plurality of precoding matrices been smoothed being indicated in a third signal transmitted from the another network node to another user equipment, wherein the third signal is at least one of a radio resource control signal or a downlink control information signal.

In another aspect thereof an exemplary embodiment provides an apparatus comprising means for receiving a precoding matrix index indicating a precoding matrix, means for allocating resources for downlink transmission to a user equipment, means for smoothing a plurality of precoding matrices including the precoding matrix across the allocated resources, and means for transmitting a signal indicating the plurality of precoding matrices been smoothed.

In a another aspect thereof an exemplary embodiment provides a method comprising transmitting a precoding matrix index indicating a precoding matrix to a network node, receiving a signal indicating a plurality of precoding matrices including the precoding matrix have been smoothed across allocated resources and performing channel estimation across the allocated resources based on the received signal.

In a another aspect thereof an exemplary embodiment provides a method comprising transmitting a precoding matrix index indicating a precoding matrix to a network node, receiving a signal indicating a plurality of precoding matrices including the precoding matrix have been smoothed across allocated resources and performing channel estimation across the allocated resources based on the received signal. The precoding matrix index can comprise at least one of a wideband precoding matrix index or a frequency selective precoding matrix index. The allocated resources are scheduled for downlink transmission, which can be on PDSCH. The plurality of precoding matrices are smoothed via interpolation of the plurality of precoding matrices across the allocated resources or via some other methods. The network node ensures or guarantees the distance between two of the plurality of precoding matrices of adjacent allocated resources being not more than a threshold, which can be a pre-defined or adjustable value or parameter. The information of the plurality of the precoding matrices been smoothed across the allocated resources can be indicated in another signal to be transferred to another user equipment, and the another signal is used for interference estimation at the another user equipment.

In a another aspect thereof an exemplary embodiment provides a method comprising transmitting a precoding matrix index indicating a precoding matrix to a network node, receiving a signal indicating a plurality of precoding matrices including the precoding matrix have been smoothed across allocated resources and performing channel estimation across the allocated resources based on the received signal. The resource allocation or scheduling is performed based on a precoded demodulation reference signal. The modification of the plurality of precoding matrices is made via interpolation, which comprises at least one of Grassmanian manifold interpolation, Flag manifold interpolation, Stiefel manifold interpolation, or Linear interpolation. The channel estimation is used for demodulating the data carried on the allocated resources. Another signal indicating the precoding matrix index been smoothed across allocated resources is transferred to another user equipment and the another signal is used for interference estimation at the another user equipment, wherein the interference estimation is part of demodulation of downlink transmission at the another user equipment.

In a another aspect thereof an exemplary embodiment provides a method comprising receiving a precoding matrix index indicating a precoding matrix, allocating resources for downlink transmission to a user equipment, smoothing a plurality of precoding matrices including the precoding matrix across the allocated resources and transmitting a signal indicating the plurality of precoding matrices been smoothed.

In a another aspect thereof an exemplary embodiment provides a method comprising receiving a precoding matrix index, at a network node, indicating a precoding matrix, allocating resources for downlink transmission to a user equipment, smoothing a plurality of precoding matrices including the precoding matrix across the allocated resources and transmitting a signal indicating the plurality of precoding matrices been smoothed. The allocated resources is for downlink transmission, which can be on PDSCH. Smoothing the plurality of precoding matrices comprises performing interpolation of the plurality of precoding matrices across the allocated resources, and it can also comprise ensuring distance between two of the plurality of precoding matrices of adjacent allocated resources being not more than a threshold. The threshold is a pre-defined parameter or an adjustable parameter. The interpolation can be one of Grassmanian manifold interpolation, Flag manifold interpolation, Stiefel manifold interpolation or Linear interpolation. The resource allocation or scheduling is performed based on a precoded demodulation reference signal. The network node will transmit another signal indicating the plurality of precoding matrices been smoothed to another network node, wherein the another signal can be an X2 signal. Moreover, the plurality of precoding matrices been smoothed being indicated in a third signal transmitted from the another network node to another user equipment, wherein the third signal is at least one of a radio resource control signal or a downlink control information signal.

In another aspect thereof an exemplary embodiment provides a computer readable medium tangibly encoded with a computer program executable by a processor to perform actions comprising transmitting a precoding matrix index indicating a precoding matrix to a network node, receiving a signal indicating a plurality of precoding matrices including the precoding matrix have been smoothed across allocated resources and performing channel estimation across the allocated resources based on the received signal.

In another aspect thereof an exemplary embodiment provides a computer readable medium tangibly encoded with a computer program executable by a processor to perform actions comprising receiving a precoding matrix index indicating a precoding matrix, allocating resources for downlink transmission to a user equipment, smoothing a plurality of precoding matrices including the precoding matrix across the allocated resources and transmitting a signal indicating the plurality of precoding matrices been smoothed.

BRIEF DESCRIPTION OF THE DRAWINGS

The foregoing and other aspects of exemplary embodiments are made more evident in the following Detailed Description, when read in conjunction with the attached Drawing Figures, wherein.

DETAILED DESCRIPTION

Figure 1:
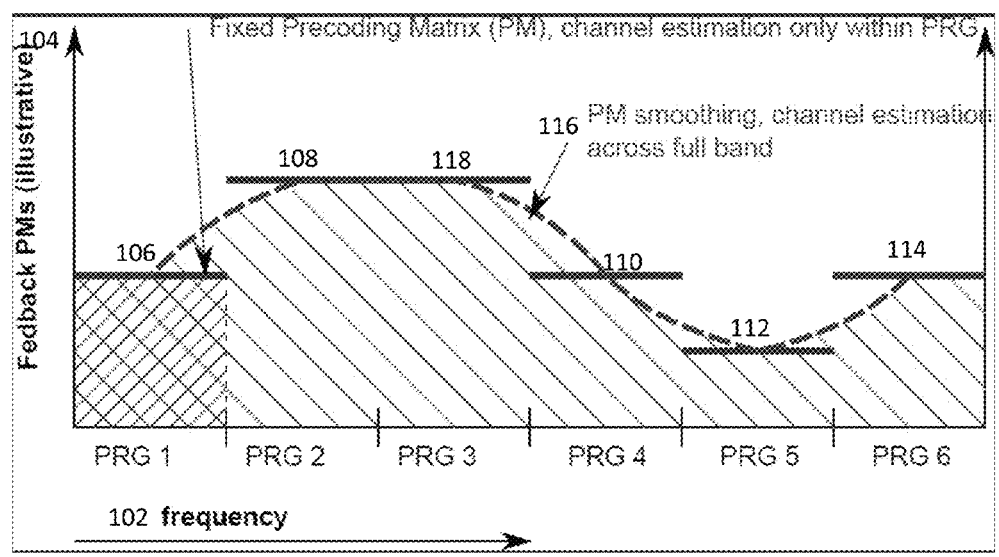
FIG. 1 illustrates the precoding matrix smoothing technique.

LTE employs a precoded spatial multiplexing scheme with codebook based feedback from UEs. Both the UE and the E-UTRAN Node B, also called evolved Node B (eNB) are aware of the predefined set of precoding matrices. Thus, only a matrix identifier, PMI, is fed back from the UE to the eNB. The user-specific reference symbols from the eNB, for example DM-RS symbols, enable the channel estimation of a wireless channel between a transmitted symbols and received symbols. The DM-RS allows the transmitter to use an arbitrary precoding matrix. However, if the precoding matrix is changed in time or frequency domain, for example, channel band, sub-band, sub-carrier, etc., it can cause the channel components to become discontinuous in time or frequency domain, which can consequently cause systematic channel estimation errors. Therefore, in LTE standard, the precoding matrix is fixed within the pre-agreed cluster of frequency resource elements, for example a PRB, a PRB pair, a PRG, PRBs within a PRG, PRGs, etc., to enable channel estimation within that cluster or a certain bandwidth. Hence, performing channel estimation per cluster, which can be per PRB, per PRB pair, per PRG or per PRGs, brings the benefit of minimizing the systematic channel estimation errors, however it causes less efficient channel estimation at the cluster edges as the channel estimation filters, such as 2D Wiener filter, may not effectively work at the cluster edges in frequency.

In principle the UE feeds back PMIs either wideband or frequency selective to the eNB or base station. If frequency selective feedback is used, the eNB has available precoding matrices (PMs) per reporting sub-band. If multiple sub-bands are scheduled for the same UE, the eNB can utilize the reported PMs per scheduling sub-bands, which can cause discontinuous channel components in at least frequency domain. Consequently, this will result in systematic channel estimation errors. In the meantime, due to the utilization of DM-RS, the eNB has also the flexibility to utilize the best precoders it sees fit. For example, an eNB employing multi-user multiple-input and multiple-output (MU-MIMO) may change the reported precoders when serving multiple users at the same frequency and/or time resource.

To avoid discontinuity of the channel estimation at UE, fixed or same precoding matrix (PM) across sub-carriers or sub-bands of PRG or PRGs can be used. For example, the PRB bundling in 3GPP is defined as precoding granularity with multiple resource blocks in the frequency domain, when PMI and/or rank indication (RI) reporting is configured. Otherwise, the UE shall assume the precoding granularity is one resource block in the frequency domain. The size of PRG is bounded to system bandwidth. For example, for 10 MHz system bandwidth, 3 PRBs form a PRG.

In one example of a channel estimation, assuming one PM for each sub-band, the eNB utilizes PM smoothing scheme after scheduling the resource with given PMs to the UE. The PM smoothing techniques may be, for example, geodesical interpolation. The eNB will ensure or guarantee that the distance or difference between the PMs of the neighbouring sub-carriers or clusters are not more than a value, i.e. epsilon, from each other. The epsilon can be a predefined number that guarantees that PM smoothing has no major impact on statistical properties of the user-specific channel, such as coherence bandwidth or coherence time. The PM smoothing technique at eNB can significantly improve the channel estimation at the UE for both single and double-layer transmission, as well as for MU-MIMO transmission, which will be further discussed below.

FIG. 1 illustrates the precoding matrix (PM) smoothing technique, which enables continuous channel estimation across the continuously allocated frequency band or sub-bands or sub-carriers or pr clusters. This drawing is based upon the assumption that channel estimation is performed per PRG.

The eNB smoothes the PMs across the allocated resources, which can be sub-bands, sub-carriers, certain bandwidth, PRGs, PRBs, PRBs within a PRG, etc., and indicates the UE that the PMs have been smoothed and the UE can estimate the channel across the allocated resources. With the knowledge of the precoder smoothing performed at the eNB, the UE can estimate the channel across the full allocated bandwidth instead of each individual allocated resource such as a PRB or a PRG.

Alternatively, channel estimation can be made without signaling to the UE that PMs have been smoothed. However, without the knowledge of the PMs been smoothed, the UE estimates channel within a PRG, through which it makes only minor precoding gain by applying interpolation.

In FIG. 1, the frequency 102 is divided into sub-carriers or sub-bands, PRG1, PRG2, PRG3, PRG4, PRG5 and PRG6. Each of the solid lines 106, 108, 118, 110, 112 and 114 represents the PM of each PRG in the illustrative feedback PMs dimension 104, and the RS is applied to each PRG. The channel estimation is made within each PRG based on the fixed precoders or PMs 106, 108, 118, 110, 112 and 114. These PMs are different from one PRG to another. In other words, the UEs estimate the channel based on the precoder or PM for each PRG without the precoder or PM smoothing technique applied. The solid lines of 108 and 118 tell us that the PMs on PRG2 and on PRG3 happen to be the same or very close to each other if not the same.

When PM smoothing technique is applied, the plurality of precoders or PMs across several PRGs are interpolated, shown as the dotted curve 116 in FIG. 1. The plurality of precoders or PMs are smoothly connected within the allocated resources, namely the combined PRG1, 2, 3, 4, 5 and 6. Thus, the discontinued PMs 106, 108, 118, 110, 112 and 114 are modified to be connected smoothly via a smoothing technique over the whole allocated bandwidth in this example. The smoothing techniques includes different interpolation or other methods.

In some circumstances, the eNB ensures that the difference between the precoders or PMs of the adjacent resources, which is PRGs as in FIG. 1, does not exceed a threshold, epsilon. The threshold can be predefined at the eNB. It can be adjustable as well. The adjustment can be made depending on the feedback from the UE. With smoothed precoders or PMs, the UE or the UEs can make channel estimation across the whole allocated frequency band, also called allocated resources, for example in FIG. 1 the frequency including PRG1, PRG2, PRG3, PRG4, PRG5 and PRG6. In some situation, the UE or UEs can estimate the channel based on the smoothed precoders or PMs across a certain combined allocated resources or PRGs, for example the combined PRG1, PRG2, PRG3 and PRG4. In that case, the smoothed PMs include the dotted curve ranging from PRG1 to PRG4. In another example, the allocated resources can be the combined PRGs3, 4 and 5. The PMs can be precoders in some other circumstances.

Figure 2:
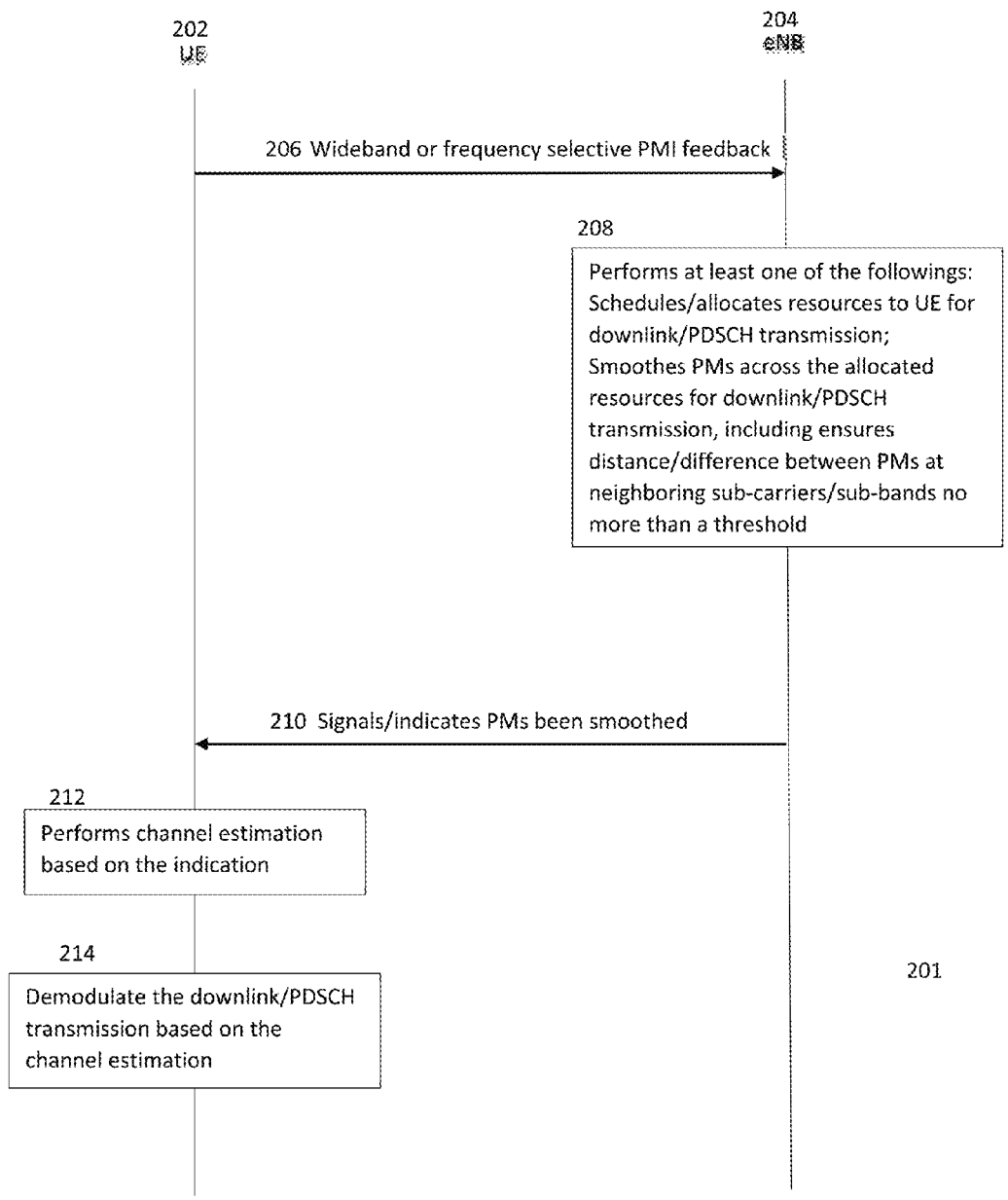
FIG. 2 illustrates an example of precoding matrix smoothing and channel estimation based on the smoothed PMs in a wireless network.

In another example of channel estimation as illustrated in FIG. 2, an example of PM smoothing and channel estimation based on the smoothed PMs in a wireless network 201, and the wireless network comprises at least a UE 202 and an eNB 204. At step 206, the eNB 204 receives a wideband or frequency selective PMI feedback from the UE 202, which includes indication of the recommended or reported precoders from the UE to the eNB. In MU-MIMO network, two users can use the same resource, when one user is with precoder W1 and another user is with precoder W2. The eNB performs zero-forcing (ZF) algorithm, for example [W1' W2']=ZF([W1 W2]). Due to ZF operation, precoders of both users are changed. This is one of the reasons that the eNB would modify the PMs received from the users. Another reason for eNB to change recommended precoder can be, for example, when it performs rank-override, which is using rank1 instead of fed-back rank2.

The eNB 204 will perform at least one of the followings: 1) schedules or allocates resources to the UE 202 for downlink transmission, such as PDSCH transmission; 2) modifies the PMs indicated by the UE due to co-scheduled UE's layer or any other reason. For example, the UE smoothes a plurality of PMs across the allocated resources, including ensures PMs at adjacent allocated resources with distance or difference no more than a threshold, epsilon. In other words, the eNB will guarantee the distance between two of the plurality of precoding matrices of adjacent allocated resources being no more than epsilon. The allocated resources can be, for example, the allocated band for PDSCH, and they can be the full band or some combined resources as part of all the allocated resources. The threshold, epsilon, can be pre-defined or adjustable.

The resources that the eNB 204 allocates to UE 202 is not limited to PDSCH resource allocation. The resources can be in a form of allocated frequency bandwidth, for example sub-carriers, sub-bands, PRGs, etc. In some cases, each allocated band, sub-band, sub-carrier, PRG has its own PM, due to frequency selective PMI feedback, MU-MIMO operation, or other reasons. By smoothing the PMs across those allocated band via interpolation or other methods and ensuring the PMs between the adjacent subcarriers are not more than epsilon, a pre-defined or adjustable parameter or threshold, from each other, the eNB 204 generates PMs which enables the UE 202 to estimate the channel across all the allocated frequency bandwidth instead of the resources of an individual sub-carrier or sub-bands or PRG.

In order to guarantee that PMs W(n) and W(n+1) on neighboring resources n and n+1 are not too far away from each other, meaning the distance or difference between adjacent PMs W(n) and W(n+1) being limited, such as epsilon E, the eNB can enforce or test the PMs by natural distance metric, for example Euclidian metric $$\forall n, \|W(n)-W(n+1)\|_F^2 < \epsilon.$$

The eNB 204 can employ various smoothing techniques to have the difference between the adjacent PMs to meet the above condition. One of the techniques is geodesical interpolation. In addition, the UE 202 may inform the eNB 204 about the type of receiver it has, for example linear receiver or non-linear receiver. Based on this knowledge, the eNB 204 can employ the correct type of PM smoothing for dual-layer transmission, where for example Grassmannian manifold interpolation is preferred for non-linear receivers and Flag manifold interpolation is preferred for linear receivers.

The sequence of allocating resources to UE for the downlink transmission and smoothing the PMs is not limited to be the same as in FIG. 2. Instead, the sequence can be altered. For instance, performing the PM smoothing can be done prior to the resource allocation, such as scheduling the downlink transmission for the UE, given the allocated band or subcarriers or sub-bands. The eNB 204 will schedule PDSCH transmission based on the precoded DM-RS and utilize the smoothed PMs. Furthermore, the PMs can be precoders instead in some other cases.

In step 210, the eNB 204 signals or sends information to indicate the UE 202 that the plurality of PMs have been smoothed and channel estimation can be made on the whole allocated bandwidth or part of the whole allocated bandwidth. The signalling or information can be carried as part of the radio resource control (RRC) signalling or downlink control information (DCI) in a way of one bit signalling or more than one bit signalling if any other information are combined to be transferred. Being informed of the PMs smoothed, the UE 202 performs channel estimation. The UE 202, in step 214, will demodulate the transmission on the downlink or PDSCH based on the channel estimation.

Figure 3:
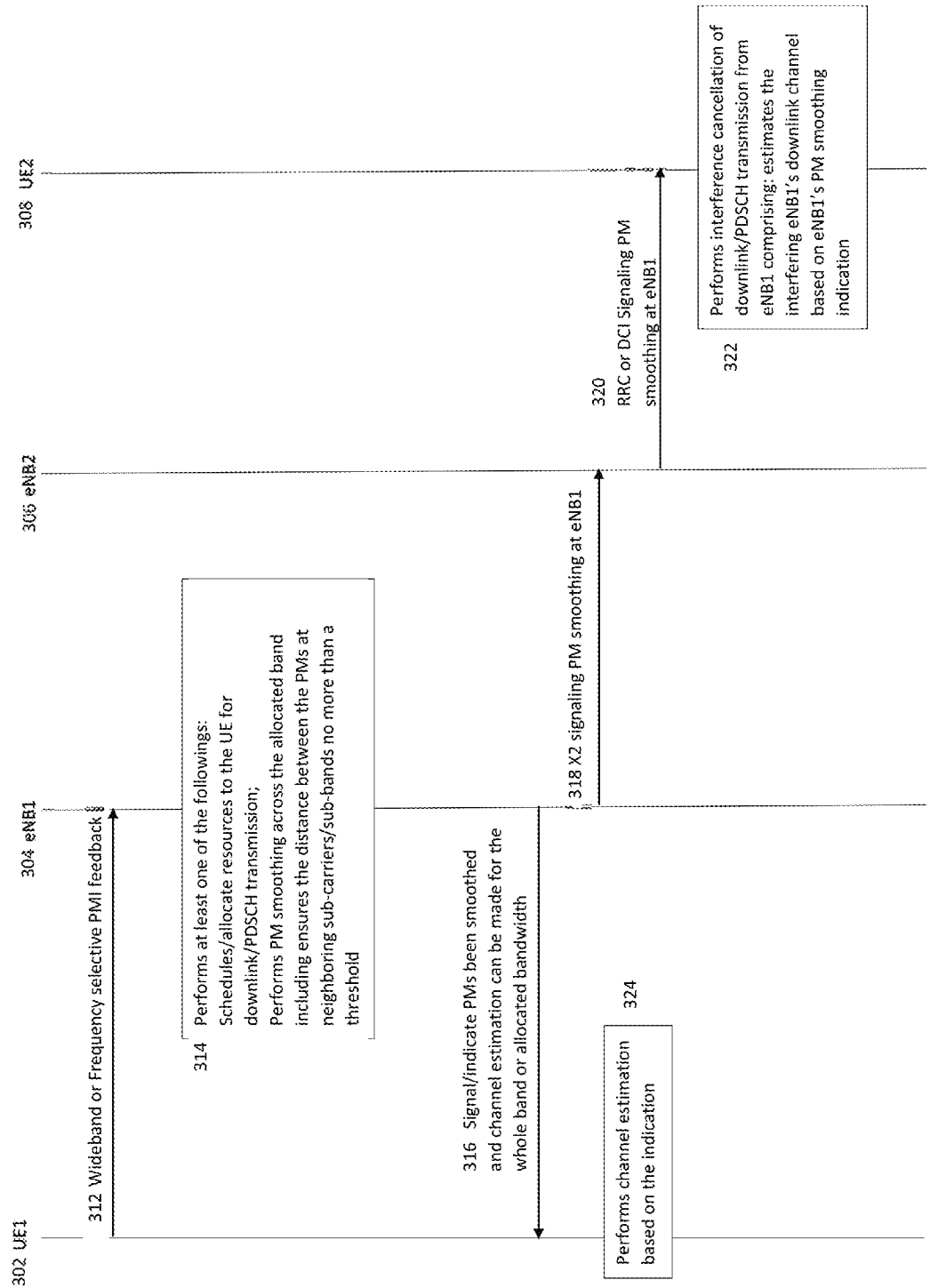
FIG. 3 illustrates another example of channel estimation by utilizing precoding matrix smoothing technique in a wireless network.

FIG. 3 illustrates another example of channel estimation by utilizing PM smoothing technique in a wireless network. Assuming UE1 302 is operated in a network via eNB1 304 and UE2 308 is operated in another network via eNB2 306. The eNB1 304 may be able to directly communicate with eNB2 306. In the meantime, the eNBs can cause interference to each other, for example, eNB1 304 can interfere the transmission from eNB2 306 to UE2 308, and vice versa. PM smoothing technique can help the interference elimination or cancellation at UE2 308.

The UE1 302, at step 312 sends the wideband or frequency selective PMI feedback to eNB1 304. The eNB1 304 will perform at least one of the followings: schedules or allocates resources to the UE1 302 for downlink or PDSCH transmission based on the precoded RS; performs PM smoothing across the scheduled or allocated resources, for example the allocated band for PDSCH, which can be the full band or some combined PRGs as part of the full band; the PM smoothing includes ensures PMs at adjacent sub-carriers or sub-bands or PRGs with distance or difference no more than a threshold epsilon. This threshold can be pre-defined or adjustable. The sequence performed by the eNB1 304 can be varied under different circumstances. In some other similar cases, the PM can be a precoder instead.

In step 316, the eNB1 304 will signal or transmit an information indicating the UE1 302 that the plurality of PMs have been smoothed so that channel estimation can be made for the whole band or allocated band including allocated sub-carriers, sub-bands, PRGs, etc. In other words, the UE1 302 is acknowledged of the PMs been smoothed and it can estimate the channel conditions based on the indication in step 324.

The eNB1 304 can also inform eNB2 306 of the PM smoothing via signalling, for example X2 signalling, in step 318. Those signalling can be a one-bit signalling. The eNB1 304 can inform the PM smoothing to UE1 302 and eNB2 306 at the same time or at different time. The knowledge of plurality of PMs been smoothed at eNB2 306 can be, as shown in step 320, transferred to UE2 308, by means of RRC signalling or DCI signalling, which will benefit the channel estimation at UE2 308, particularly when eNB1 304 causes interference to the transmission between eNB2 306 and UE2 308. In addition, the eNB1 304 can send a signal to indicate UE2 308 about the PMs smoothing across the allocated resources directly. The UE2 308 will demodulate the downlink transmission from eNB2 306. The UE2 308 will perform interference cancellation of the transmission from eNB1 at step 322, which comprises the estimation of the precoded reference signal (RS) transmitted from eNB1 304 to UE1 302 to estimate the interfering eNB1's downlink channel based on eNB1's PM smoothing indication. The interference estimation can be used for interference reduction or interference cancellation.

The UE2 308 can include an advanced UE receiver such as symbol level interference cancellation (SLIC) receiver with interference cancellation capability, or reduced maximum likelihood (R-ML) receiver which receives one bit DCI or RRC signalling indicating that interfering eNB1 304 performs PM smoothing across the allocated resources. The allocated resources can be allocated frequency resources, such as allocated sub-carriers, sub-bands, PRGs, etc. Therefore, the advanced receiver residing in the UE2 308 may obtain better DM-RS based channel estimation result of the interfering channel for blind detection processing.

Figure 4:
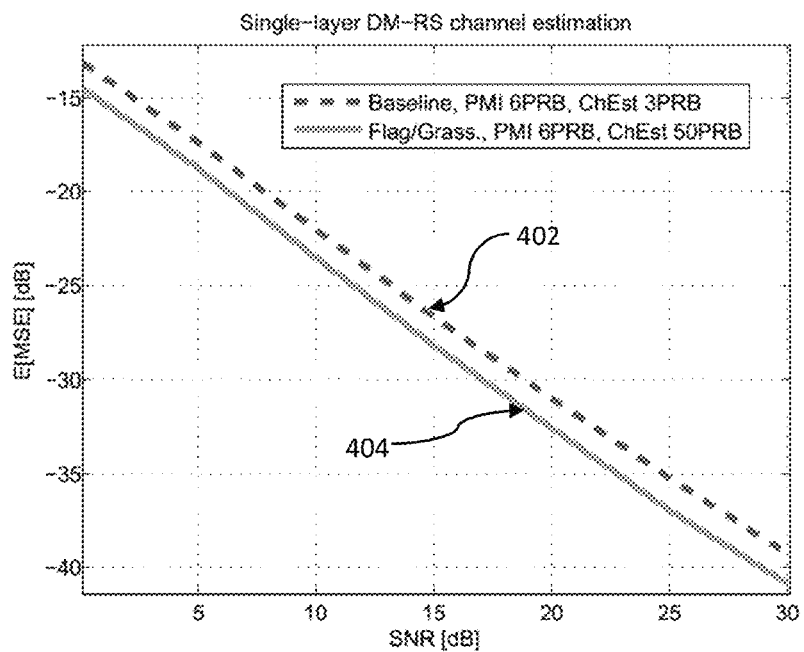
FIG. 4 illustrates an example of a simulation result of normalized mean square error (MSE) of a single layer DM-RS channel estimation.

FIG. 4 illustrates an example of a simulation result of normalized mean square error (MSE) of a single layer DM-RS channel estimation. A 2D Wiener filter is used for channel estimation to obtain comparison between PM within group of 3 PRBs and PMs interpolated in frequency. In other words, 1 PRG consists of 3 PRBs in this case. The PM information at the eNB varies in frequency due to frequency selective feedback. In practice, PM may be changed as well due to MU-MIMO operation. A full band of 50 PRBs is assumed in this simulation.

The normalized mean square error (MSE) versus signal to noise ratio (SNR) for downlink transmission over antenna ports 7 and 8 according to the current 3GPP LTE standard is studied. The dotted line 402 shows the MSE result of channel estimation versus SNR based on the fixed PMs feedback with 6 PRB granularity without applying smoothing technique. The channel estimation is made on each PRG, which is 3 PRBs. The solid line 404 tells us the MSE result of channel estimation based on the PMs feedback with 6 PRB granularity across the whole 50 PRBs by applying PM smoothing technique, for example, Grassmannian manifold interpolation or Flag manifold interpolation. These two interpolation techniques generate very similar MSE results on the channel estimation to the point that they are so close that almost overlaid each other in the line 404. It is observed that using the PM interpolation for channel estimation gains 2 dB in terms of MSE of the channel estimation comparing to without utilizing the PM smoothing techniques.

Figure 5:
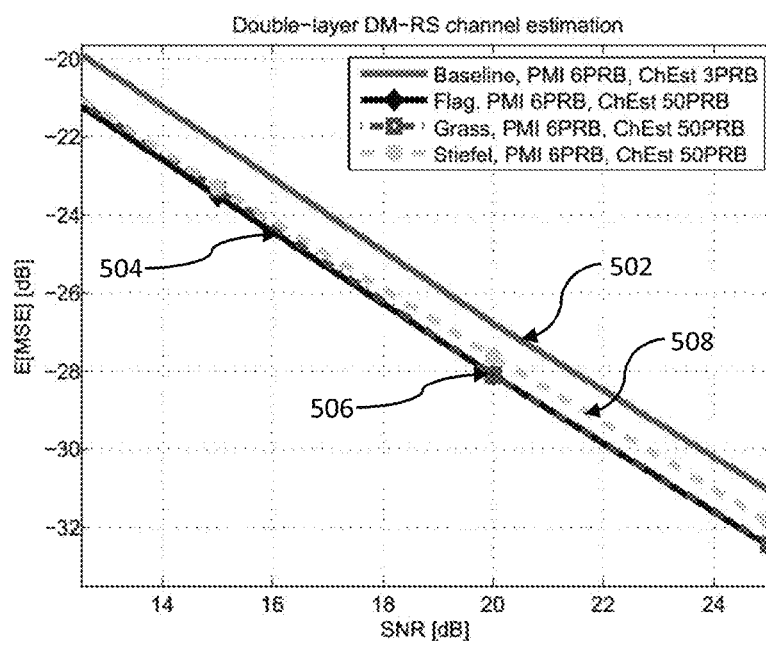
FIG. 5 illustrates an example of a simulation result of normalized MSE of dual layer channel estimations.

FIG. 5 illustrates an example of a simulation result of normalized MSE of dual layer channel estimations. The lines or curves of 502, 504, 506 and 508 respectively represent the result of MSE of the channel estimation of 3 PRBs based on the PMs fed back with 6 PRBs granularity without PM smoothing, the result of MSE of the channel estimation of the whole 50 PRBs with smoothing techniques of Flag manifold interpolation, Grassmannian manifold interpolation and Stiefel manifold interpolation.

It is not hard to see again the similarity between the MSE results of channel estimation based on smoothed PMs via applying Flag manifold interpolation 504 and Grassmannian manifold interpolation 506. The channel estimation has higher MSE based on smoothed PMs from using Stiefel manifold interpolation 508 rather than using Grassmannian manifold interpolation 504 or Stiefel manifold interpolation 508, while still has lower MSE than the estimation channel made without applying PM smoothing technique. In the low range of SNRs, for example, between 0 dB and 18 dB, there is around 2 dB difference in MSE of the channel estimation between utilizing any of the three previously mentioned PM smoothing techniques and not utilizing any PM smoothing technique. When the SNR at a UE is higher, for example, above 18 dB, Flag manifold interpolation or the Grassmannian manifold interpolation for PM smoothing benefits in lower MSE of channel estimation than Stiefel manifold interpolation for PM smoothing, which obtains at least 1 dB lower MSE of channel estimation than channel estimation made without using any PM smoothing technique.

Figure 6:
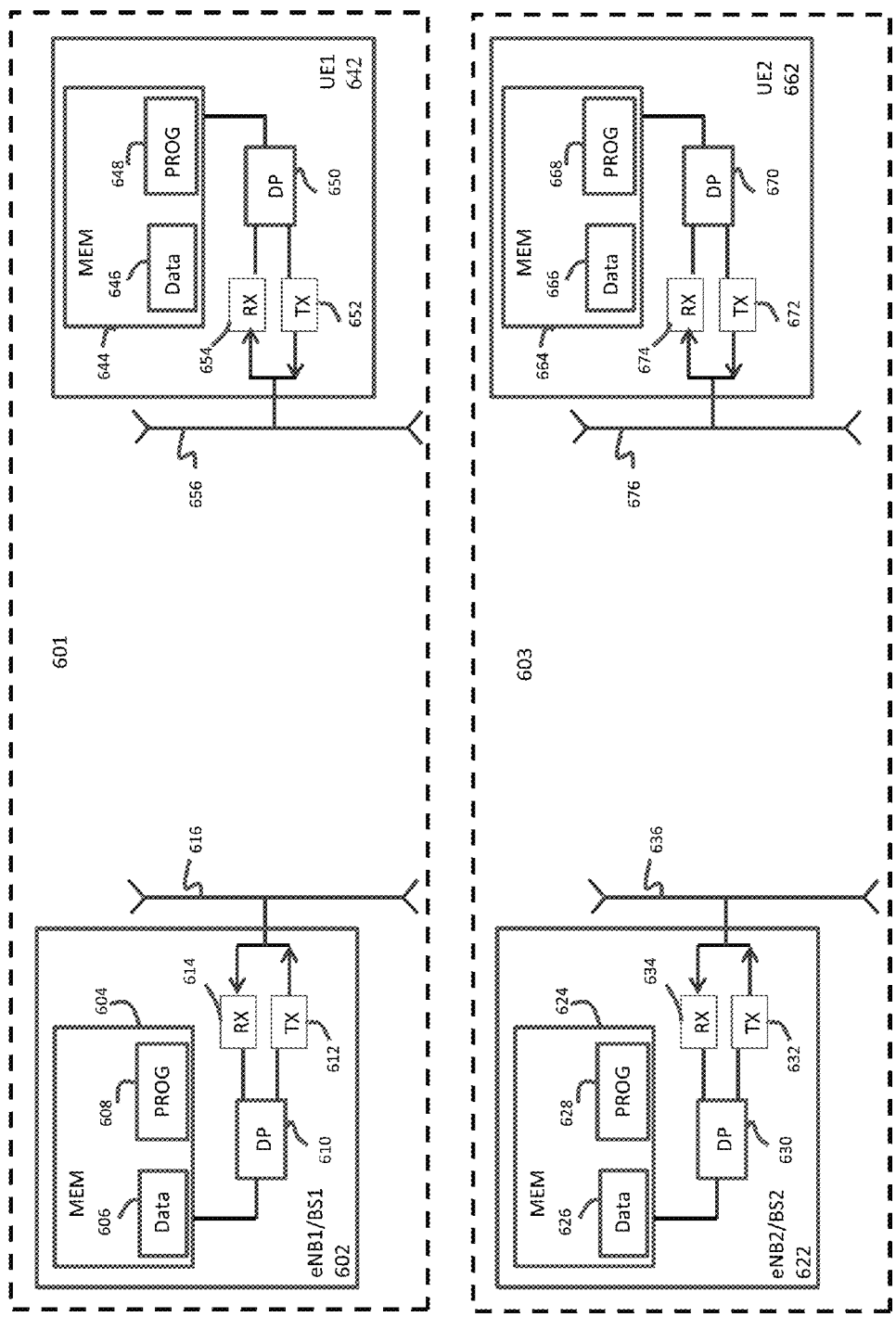
FIG. 6 illustrates an example of a simplified block diagram of channel estimation.

Reference is now made to FIG. 6, an illustration of an example of a simplified block diagram of channel estimation that are suitable for use in practicing various example embodiments of this invention. In FIG. 6, a wireless system 600 is adapted for communication between UEs 642, 662 and eNBs or base stations (BS) 602, 622. UE1 642 and UE2 662 represent two UEs with MU-MIMO capability to whom eNB1 602 and eNB2 622 communicates with respectively. Assuming UE1 642 and eNB1 602 are operated in network1 601 and UE2 662 and eNB2 622 are operated in a neighboring network2 603. The transmission from eNB1 602 to UE1 642 or other UEs in network1 601 can interfere the reception at UE2 662 in network2 603. Similarly, transmission from eNB2 622 to UE2 662 or other UEs in network2 603 can cause interference to the reception at UE1 642 of network1 601.

The eNB1 602 and eNB2 622 are respectively adapted for communication over a wireless link with one or more apparatuses, for example mobile devices, mobile stations, mobile terminals, smart devices or UEs like UE1 642 and UE2 662. The eNB may be an access point, an access node, a base station, or an eNB similar to eNB 204 of FIG. 2 and eNB1 304 and eNB2 306 of FIG. 3, wherein an eNB may comprise a frequency selective repeater, of any wireless network such as LTE, LTE-A, GSM, GERAN, WCDMA, CDMA, Wireless LAN, and the like. It is commonly found that one or more UEs are under the control of an eNB such as eNB 602. And, same for eNB2 622. For simplicity, UE1 642 is shown in FIG. 6 as an example of a wireless link in one network, which can be in MU-MIMO communication mode, as well as UE2 662 in another network. The transmission from the eNB in one network may interfere the receiving of the UE in the other network.

The UE1 642 may be a user device similar to UE 202 in FIG. 2 and UE1 302 in FIG. 3 and UE2 662 may be similar to UE2 308 in FIG. 3. The UEs and eNBs are illustrated here for carrying out embodiments of the present invention usually involves communication using a communication network.

The UE1 642 includes processing means such as at least one data processor, DP 650, storing means such as at least one computer-readable memory, MEM 644, for storing data 646, at least one computer program, PROG 648, or other set of executable instructions, and communication means such as a transmitter, TX 652, and a receiver, RX 654, which are enabled to carried MIMO communications, for bidirectional wireless communications with the eNB1 602 via one or more antenna 656, which is two antennas shown in FIG. 6 for bidirectional MU-MIMO communication between the UE1 642 and the eNB1 602. Similarly, UE2 662 includes processing means such as at least one data processor, DP 670, storing means such as at least one computer-readable memory, MEM 664, for storing data 666, at least one computer program, PROG 668, or other set of executable instructions, and communication means such as a transmitter, TX 672, and a receiver, RX 674 for bidirectional wireless communications with the eNB2 622 via one or more antenna 676, which is two antennas for bidirectional MU-MIMO communication between the UE2 662 and the eNB2 622.

The eNB1 602 also includes processing means such as at least one data processor, DP 610, storing means such as at least one computer-readable memory, MEM 604, for storing data 606 and at least one computer program, PROG 608, or other set of executable instructions. The eNB1 602 may also include communication means such as a transmitter, TX 612, and a receiver, RX 614, for bidirectional wireless communications with one or more UEs such as UE1 642 via antenna 616.

Similarly, the eNB2 622 includes processing means for example at least one data processor, DP 630, storing means such as at least one computer-readable memory, MEM 624, for storing data 626 and at least one computer program, PROG 628, or other set of executable instructions. The eNB2 622 can also include communication means such as a transmitter, TX 632, and a receiver, RX 634, for bidirectional wireless communications with one or more UEs such as UE2 662 through antenna 636.

The at least one of PROG 608 and PROG 628 in the eNB1 602 and eNB2 622, respectively, includes a set of program instructions which, when executed by the associated DP 610, enable the device to operate in accordance with the exemplary embodiments of the present invention, as detailed above. The UE1 642 and UE2 662 also stores software 648 and 668, respectively, in their MEM 644 and MEM 664 to implement certain exemplary embodiments of this invention. Thus, the exemplary embodiments of this invention may be implemented at least in part by computer software stored on MEMs, which are executed by the DP 650 of the UE1 642 and by the DP 610 of the eNB1 602, and/or by the DP 670 of the UE2 662 and by the DP 630 of eNB2 622, or by hardware, or by a combination of stored software and hardware and/or firmware. Electronic devices implementing these aspects of the invention need not be the entire devices as depicted in FIGS. 1 to 5. Instead, they may be one or more components of same such as the above described stored software, hardware, firmware and DP, or a system on a chip, SoC, or an application specific integrated circuit, ASIC.

Data processors 610, 630, 650 and 670 may comprise, for example, at least one of a microprocessor, application-specific integrated chip, ASIC, field-programmable gate array, FPGA, and a microcontroller. Data processor 610, 630, 650 and 670 may comprise at least one, and in some embodiments more than one, processing core. Memory 604, 624, 644 and 664 may comprise, for example, at least one of magnetic, optical and holographic or other kind or kinds of memory. At least part of memory 604, 624, 644 and 664 may be comprised in data processor 610, 630, 650 and 670. At least part of memory 604, 624, 644 and 664 may be comprised externally to data processor 610, 630, 650 and 670.

The various embodiment of the UE1 642 and UE2 662 can include, but are not limited to personal portable digital devices having wireless communication capabilities, including but not limited to wireless handsets, cellular telephones, navigation devices, laptop/palmtop/tablet computers, digital cameras and music devices, and Internet appliances.

Various embodiments of the computer readable MEMs 604, 624, 644 and 664 include any data storage technology type which is suitable to the local technical environment, which includes but not limited to semiconductor based memory devices, magnetic memory devices and systems, optical memory devices and systems, fixed memory, removable memory, disc memory, flash memory, DRAM, SRAM, EEPROM and the like. Various embodiments of the DPs 610, 630, 650 and 670 include but are not limited to general purpose computers, special purpose computers, microprocessors, digital signal processors, DSPs, and multi-core processors.

As is detailed above, in one embodiment the UE1 642 transmits a wideband or frequency/band selective PMI feedback to eNB1 602. The eNB will take one of the following actions in non-limited order: schedules or allocates resources to the UE1 642 with downlink transmission; modifies the reported PMI, for example, smoothes PM across the allocated resources, i.e. bandwidth, sub-bands, sub-carriers, bands, frequencies, etc.; ensures or guarantees PMs at adjacent subcarriers or sub-bands are not more than a parameter or threshold, which may be pre-defined or adjustable. Then eNB1 602 sends a signal or information or message or indication to indicate that PMs have been smoothed. Thus, the channel estimation can be made on the whole allocated resource at UE1 642. The smoothing technique can include various interpolation methods as discussed above or other methods that have not been discussed. UE1 642 makes channel estimation based on the signal or the information or the message or the indication, and the result of the channel estimation can be used for demodulating data or control signals sent from eNB1 602 to UE1 642.

In a further exemplary embodiment, the data transmission from eNB2 622 to UE2 662 becomes interfering the transmission from eNB1 602 to UE1 642, assuming eNB1 602 and UE1 642 belong to network1 601 which is adjacent to network2 603 comprising eNB2 622 and UE2 662. Similarly, the transmission from eNB1 602 to UE1 642 can cause interference to the receiving at UE2 662 from eNB2 622. Under such circumstance, continued from the eNB1 602 smoothing the PMs of the allocated resources as discussed above, eNB1 602 will inform both UE1 642 and eNB2 622 that PM smoothing has been performed by eNB1 602 instead of indicating to UE1 642 only. Then, eNB1 602 will transmit this information, PM been smoothed, to UE2 662 directly or through eNB2 622 so that UE2 662 can estimate the interference from eNB1 602 based on this information and benefit its own signal receiving through alleviating or cancelling the interference.

In another exemplary embodiment, the means for modifying a plurality of precoding matrices can be interpolating the matrices or via other methods across the allocated resources. The interpolation of the plurality of precoding matrices can include limiting the distance or difference between two of the plurality of precoding matrices of adjacent allocated resources being no more than a threshold, which is either pre-defined or adjustable.

In another exemplary embodiment, an apparatus comprising at least one processor and at least one memory including computer program code, wherein the at least one memory and the computer program code are configured, with the at least one processor, to cause said apparatus to transmit a precoding matrix index indicating a precoding matrix to a network node, receive a signal indicating a plurality of precoding matrices including the precoding matrix have been smoothed across allocated resources, and perform channel estimation across the allocated resources based on the received signal.

In another exemplary embodiment, an apparatus comprising at least one processor and at least one memory including computer program code, wherein the at least one memory and the computer program code are configured, with the at least one processor, to cause said apparatus to receive a precoding matrix index indicating a precoding matrix, allocate resources for downlink transmission to a user equipment, smooth a plurality of precoding matrices including the precoding matrix across the allocated resources, and transmit a signal indicating the plurality of precoding matrices been smoothed.

In another exemplary embodiment, a method comprising transmitting a precoding matrix index indicating a precoding matrix to a network node, receiving a signal indicating a plurality of precoding matrices including the precoding matrix have been smoothed across allocated resources and performing channel estimation across the allocated resources based on the received signal.

In another exemplary embodiment, a method comprising receiving a precoding matrix index indicating a precoding matrix, allocating resources for downlink transmission to a user equipment, smoothing a plurality of precoding matrices including the precoding matrix across the allocated resources and transmitting a signal indicating the plurality of precoding matrices been smoothed.

In another exemplary embodiment, an apparatus comprising means for transmitting a precoding matrix index indicating a precoding matrix to a network node, means for receiving a signal indicating a plurality of precoding matrices including the precoding matrix have been smoothed across allocated resources, and means for performing channel estimation across the allocated resources based on the received signal.

In another exemplary embodiment, an apparatus comprising means for receiving a precoding matrix index indicating a precoding matrix, means for allocating resources for downlink transmission to a user equipment, means for smoothing a plurality of precoding matrices including the precoding matrix across the allocated resources, and means for transmitting a signal indicating the plurality of precoding matrices been smoothed.

It should be appreciated that the practice of the invention is not limited to the exemplary embodiments discussed here. For example, the PM can be a precoder. Various modifications and adaptations to the foregoing exemplary embodiments of this invention may become apparent to those skilled in the arts in view of the foregoing description. Furthermore, some of the various features of the above non-limiting embodiments may be used to advantage without the corresponding use of other described features.

The foregoing description should therefore be considered as merely illustrative of the principles, teaching and exemplary embodiments of the present invention, and not in limitation thereof.

What is claimed is:

1. A method comprising:
   transmitting a subband precoding matrix index indicating a precoding matrix to a network node;
   receiving a signal indicating a plurality of precoding matrices including the subband precoding matrix have been smoothed across allocated resources; and
   performing channel estimation across the allocated resources based on the received signal,
   wherein the smoothed precoding matrix is based on precoding matrix of each of the allocated resources, and the allocated resources comprise more than one subband.

2. The method as in claim 1, wherein the allocated resources are scheduled for downlink transmission.

3. The method as in claim 1, wherein the plurality of precoding matrices are smoothed via interpolation of the plurality of precoding matrices across the allocated resources.

4. The method as in claim 1, further comprising distance between two of the plurality of precoding matrices of adjacent allocated resources being not more than a threshold.

5. The method as in claim 1, wherein the plurality of the precoding matrices been smoothed across the allocated resources is indicated in another signal transferred to another user equipment, and the another signal is used for interference estimation at the another user equipment.

6. A method comprising:
- receiving a subband precoding matrix index or a frequency selective precoding matrix index indicating a precoding matrix;
- allocating resources for downlink transmission to a user equipment;
- smoothing a plurality of precoding matrices including the subband precoding matrix across the allocated resources; and
- transmitting a signal indicating the plurality of precoding matrices been smoothed,
- wherein the smoothed precoding matrix is based on precoding matrix of each of the allocated resources, and the allocated resources comprise more than one subband.

7. The method as in claim 6, wherein the allocated resources is for the downlink transmission and the downlink transmission is on physical downlink shared channel.

8. The method as in claim 6, wherein smoothing the plurality of precoding matrices comprises performing interpolation of the plurality of precoding matrices across the allocated resources.

9. The method as in claim 6, wherein smoothing the plurality of precoding matrices comprises ensuring distance between two of the plurality of precoding matrices of adjacent allocated resources being not more than a threshold.

10. The method as in claim 6, further comprising transmitting another signal indicating the plurality of precoding matrices been smoothed to another network node, wherein the another signal can be an X2 signal.

11. The method as in claim 6, further comprising the plurality of precoding matrices been smoothed being indicated in a third signal transmitted from the another network node to another user equipment, wherein the third signal is at least one of a radio resource control signal or a downlink control information signal.

12. An apparatus, comprising:
- at least one processor; and
- at least one memory including computer program code,
- said at least one memory and said computer program code configured, with said at least one processor, to cause said apparatus to at least:
- transmit a subband precoding matrix index or a frequency selective precoding matrix index indicating a precoding matrix to a network node;
- receive a signal indicating a plurality of precoding matrices including the subband precoding matrix have been smoothed across allocated resources; and
- perform channel estimation across the allocated resources based on the received signal,
- wherein the smoothed precoding matrix is based on precoding matrix of each of the allocated resources, and the allocated resources comprise more than one subband.

13. The apparatus as in claim 12, wherein the allocated resources are scheduled for downlink transmission.

14. The apparatus as in claim 12, wherein the plurality of precoding matrices are smoothed via interpolation of the plurality of precoding matrices across the allocated resources.

15. The apparatus as in claim 12, further comprising distance between two of the plurality of precoding matrices of adjacent allocated resources being not more than a threshold.

16. The apparatus as in claim 12, wherein the plurality of the precoding matrices been smoothed across the allocated resources is indicated in another signal transferred to another user equipment, and the another signal is used for interference estimation at the another user equipment.

17. An apparatus, comprising:
- at least one processor; and
- at least one memory including computer program code,
- said at least one memory and said computer program code configured, with said at least one processor, to cause said apparatus to at least:
- receive a subband precoding matrix index or a frequency selective precoding matrix index indicating a precoding matrix;
- allocate resources for downlink transmission to a user equipment;
- smooth a plurality of precoding matrices including the subband precoding matrix across the allocated resources; and
- transmit a signal indicating the plurality of precoding matrices been smoothed,
- wherein the smoothed precoding matrix is based on precoding matrix of each of the allocated resources, and the allocated resources comprise more than one subband.

18. The apparatus as in claim 17, wherein the allocated resources is for the downlink transmission and the downlink transmission is on physical downlink shared channel.

19. The apparatus as in claim 17, wherein smoothing the plurality of precoding matrices comprises performing interpolation of the plurality of precoding matrices across the allocated resources.

20. The apparatus as in claim 17, wherein smoothing the plurality of precoding matrices comprises ensuring distance between two of the plurality of precoding matrices of adjacent allocated resources being not more than a threshold.

21. The apparatus as in claim 17, wherein said memory and said computer program code are further configured, with said at least one processor, to cause said apparatus to further transmit another signal indicating the plurality of precoding matrices been smoothed to another network node, wherein the another signal can be an X2 signal.

22. The apparatus as in claim 17, further comprising the plurality of precoding matrices been smoothed being indicated in a third signal transmitted from the another network node to another user equipment, wherein the third signal is at least one of a radio resource control signal or a downlink control information signal.

* * * * *